(No Model.)
P. J. COONEY.
BRAKE FOR HOSE CARRIAGES.
No. 341,455. Patented May 11, 1886.
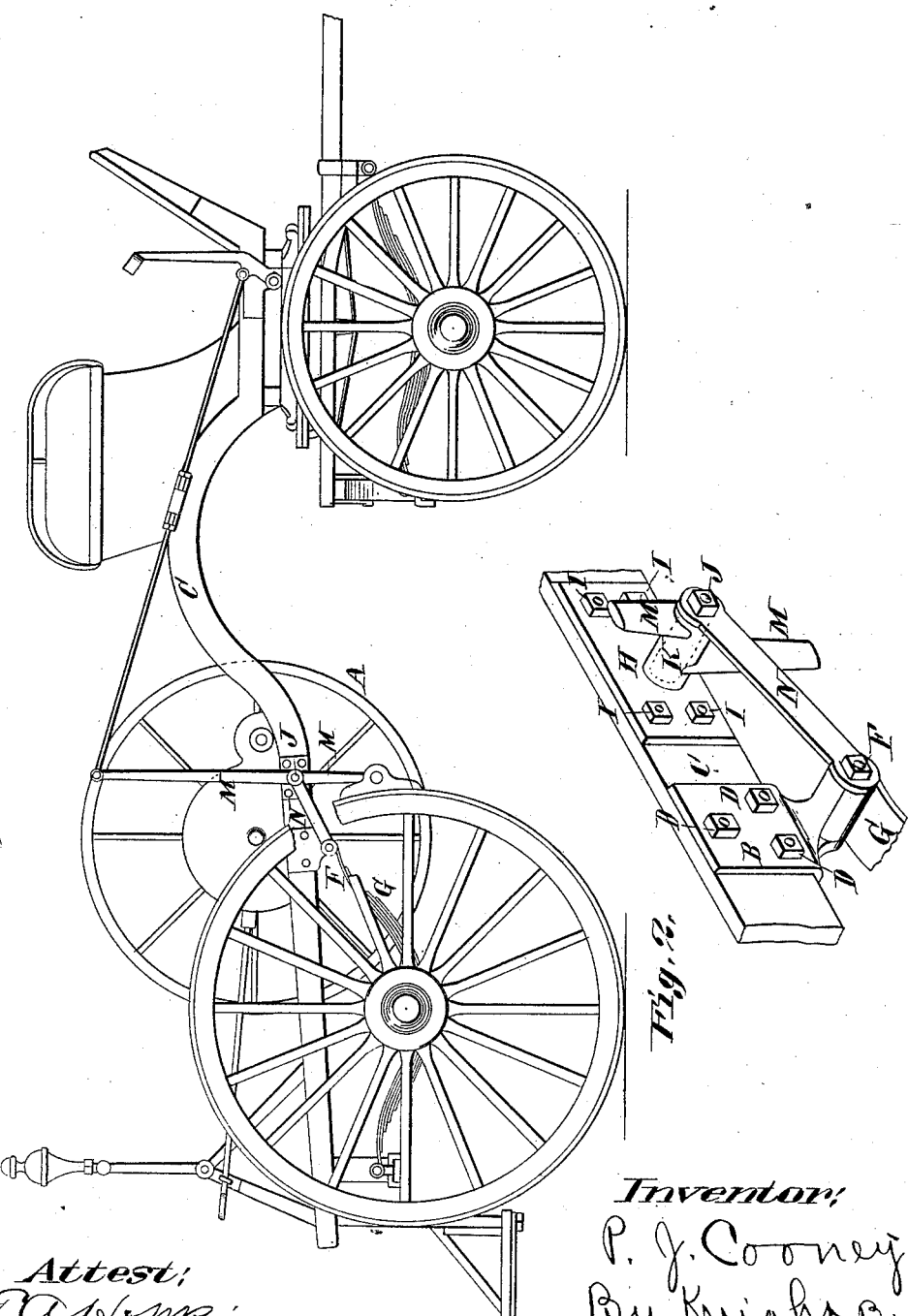
Attest:
F. A. Hopkins
Geo. L. Wheelock
Inventor,
P. J. Cooney
By Knight Bros
Attys

UNITED STATES PATENT OFFICE.

PATRICK J. COONEY, OF ST. LOUIS, MISSOURI.

BRAKE FOR HOSE-CARRIAGES.

SPECIFICATION forming part of Letters Patent No. 341,455, dated May 11, 1886.

Application filed January 14, 1886. Serial No. 188,572. (No model.)

*To all whom it may concern:*

Be it known that I, PATRICK J. COONEY, of the city of St. Louis, in the State of Missouri, have invented a certain new and useful Improvement in Brake Attachments for Hose-Carriages, of which the following is a full, clear, and exact description, reference being had to the accompanying drawings, forming part of this specification, and in which—

Figure 1 is a side elevation of a hose-carriage with my improvement applied. Fig. 2 is a detail perspective view showing part of the frame of the wagon and part of my attachment.

My invention relates to an improved form of brake attachment to the wagon; and it consists in features of novelty, hereinafter fully described, and pointed out in the claim.

Referring to the drawings, A represents a hose-carriage of any well-known construction.

B represents a bracket secured to the frame C of the carriage by bolts D. This bracket has an extension, F, to which one end of the spring G on this side of the rear part of the carriage is secured.

H represents another bracket secured to the frame C by bolts I. This bracket has an extension, J, to receive the hub K of the brake-bar M. The outer ends of the extensions F and J are connected by a strengthening-plate, N. By this arrangement the brake or bar can be connected to any hose-carriage in a short time, and, if broken, can be replaced by another by simply removing the bolts I, and by removing the nuts of the projections F and J.

I claim as my invention—

The combination, in a hose-carriage, of the frame C, brackets B H, bolted to the frame, and having extensions F and J, spring G, secured to the extensions F, brake-bar M, secured to the extension J, and plate N, connecting the extensions, substantially as and for the purpose set forth.

PATRICK J. COONEY.

In presence of—
SAML. KNIGHT,
EDW. S. KNIGHT.